US009753985B2

(12) United States Patent
Mule et al.

(10) Patent No.: US 9,753,985 B2
(45) Date of Patent: Sep. 5, 2017

(54) METHODS AND APPARATUS FOR MANAGING CONFIGURATION SETTINGS

(71) Applicants: SLING MEDIA INC., Foster City, CA (US); SLING MEDIA PVT LTD, Bangalore (IN)

(72) Inventors: Sachin D. Mule, Bangalore (IN); Andrey L. Abramov, Foster City, CA (US); Yohann Georges, San Francisco, CA (US)

(73) Assignees: Sling Media PVT Ltd., Bangalore (IN); Sling Media, Inc., Foster City, CA (US)

( * ) Notice: Subject to any disclaimer, the term of this patent is extended or adjusted under 35 U.S.C. 154(b) by 177 days.

(21) Appl. No.: 14/053,852

(22) Filed: Oct. 15, 2013

(65) Prior Publication Data
US 2014/0108384 A1    Apr. 17, 2014

Related U.S. Application Data

(60) Provisional application No. 61/713,017, filed on Oct. 12, 2012.

(51) Int. Cl.
*G06F 17/30* (2006.01)
*H04L 12/28* (2006.01)
*H04L 12/24* (2006.01)

(52) U.S. Cl.
CPC .... *G06F 17/30522* (2013.01); *H04L 12/2803* (2013.01); *H04L 41/0843* (2013.01); *H04L 41/0886* (2013.01); *H04L 41/0893* (2013.01)

(58) Field of Classification Search
None
See application file for complete search history.

(56) References Cited

U.S. PATENT DOCUMENTS

| | | | |
|---|---|---|---|
| 2002/0147715 A1 | 10/2002 | Beyer | |
| 2007/0239700 A1* | 10/2007 | Ramachandran | ... H04L 41/0866 |
| 2010/0035613 A1* | 2/2010 | Schroter | ........... H04M 1/72572 |
| | | | 455/435.1 |
| 2010/0309799 A1 | 12/2010 | Nunzi et al. | |

OTHER PUBLICATIONS

European Patent Office, Extended Search Report, dated Mar. 5, 2014 for European Patent Application No. 13188572.5.

* cited by examiner

*Primary Examiner* — Belix M Ortiz Ditren
(74) *Attorney, Agent, or Firm* — LK Global

(57) ABSTRACT

A configuration settings datastore is partitioned into data groups. Each data group includes a set of configuration settings, a set of membership criteria, and a weight. A request is received for configuration settings for a networked device, the request including a set of parameters associated with the networked device. A set of desired configuration settings are selected from the datastore based on the sets of membership criteria, the set of parameters, and the weights of the plurality of data groups. The desired configuration settings are then transmitted to the networked device.

18 Claims, 3 Drawing Sheets

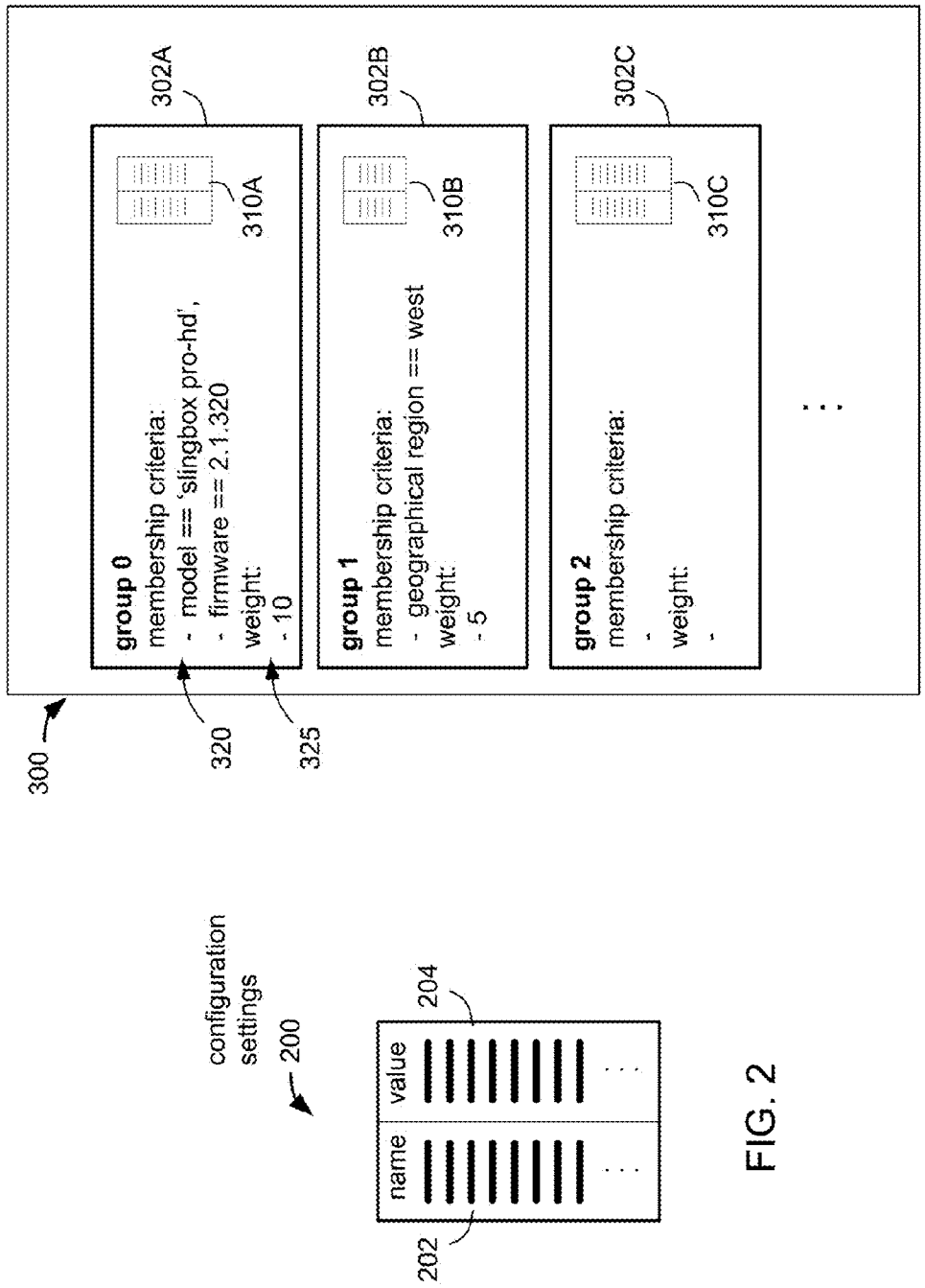

METHODS AND APPARATUS FOR MANAGING CONFIGURATION SETTINGS

CROSS-REFERENCE TO RELATED APPLICATIONS

This application claims priority to U.S. Provisional Patent Application No. 61/713,017, filed Oct. 12, 2012, the entire contents of which are incorporated by reference herein.

TECHNICAL FIELD

The present disclosure generally relates to systems and techniques for processing media content such as television programming and movies within a home entertainment system. More particularly, the present disclosure relates to the management of configuration settings used in connection with home entertainment devices.

BACKGROUND

Home entertainment devices typically include a large number of configuration settings. Some of these settings are related to the device itself (e.g., model number, firmware version, etc.), some relate to functional groups (beta, etc.), and some relate to the particular installation (e.g., geographical region, Internet provider, etc.). Still others relate to user-configurable settings (device name, IP address, etc.).

Since most home entertainment devices are connected to a network (e.g., the Internet), it is desirable to manage configuration settings "in the cloud." However, such administration is difficult given the large number of devices on the network (i.e., scalability) as well as the large number of configuration settings needed for each device. Furthermore, it is intractable to test every possible combination of settings for all possible environments.

It is therefore desirable to provide systems and methods for managing configuration settings for networked home entertainment devices. These and other desirable features and characteristics will become apparent from the subsequent detailed description and the appended claims, taken in conjunction with the accompanying drawings and this background section.

BRIEF DESCRIPTION OF THE DRAWING FIGURES

Exemplary embodiments will hereinafter be described in conjunction with the following drawing figures, wherein like numerals denote like elements, and FIG. 1 is a conceptual overview of an exemplary placeshifting system.

FIG. 2 illustrates an exemplary configuration settings data structure.

FIG. 3 illustrates an exemplary data store data structure in accordance with various embodiments.

DETAILED DESCRIPTION

The following detailed description of the invention is merely exemplary in nature and is not intended to limit the invention or the application and uses of the invention. Furthermore, there is no intention to be bound by any theory presented in the preceding background or the following detailed description.

In general, systems in accordance with the present invention employ a datastore in which sets of configuration settings are partitioned into "groups," each having a corresponding "membership criteria" and "weight." The desired configuration settings can be determined for a particular device based on which groups it falls within in combination with the weights (or respective priority) of those groups.

While the subject matter presented herein may be used in connection with a wide range of entertainment devices interconnected over a network (i.e. any device that includes configuration settings), it is illustrative to describe the invention with reference to a particular system—e.g., a placeshifting system. It will be appreciated, however, that the invention is not so limited, and that any networked device incorporating configuration settings may benefit from the system and methods described herein.

Figure 1:
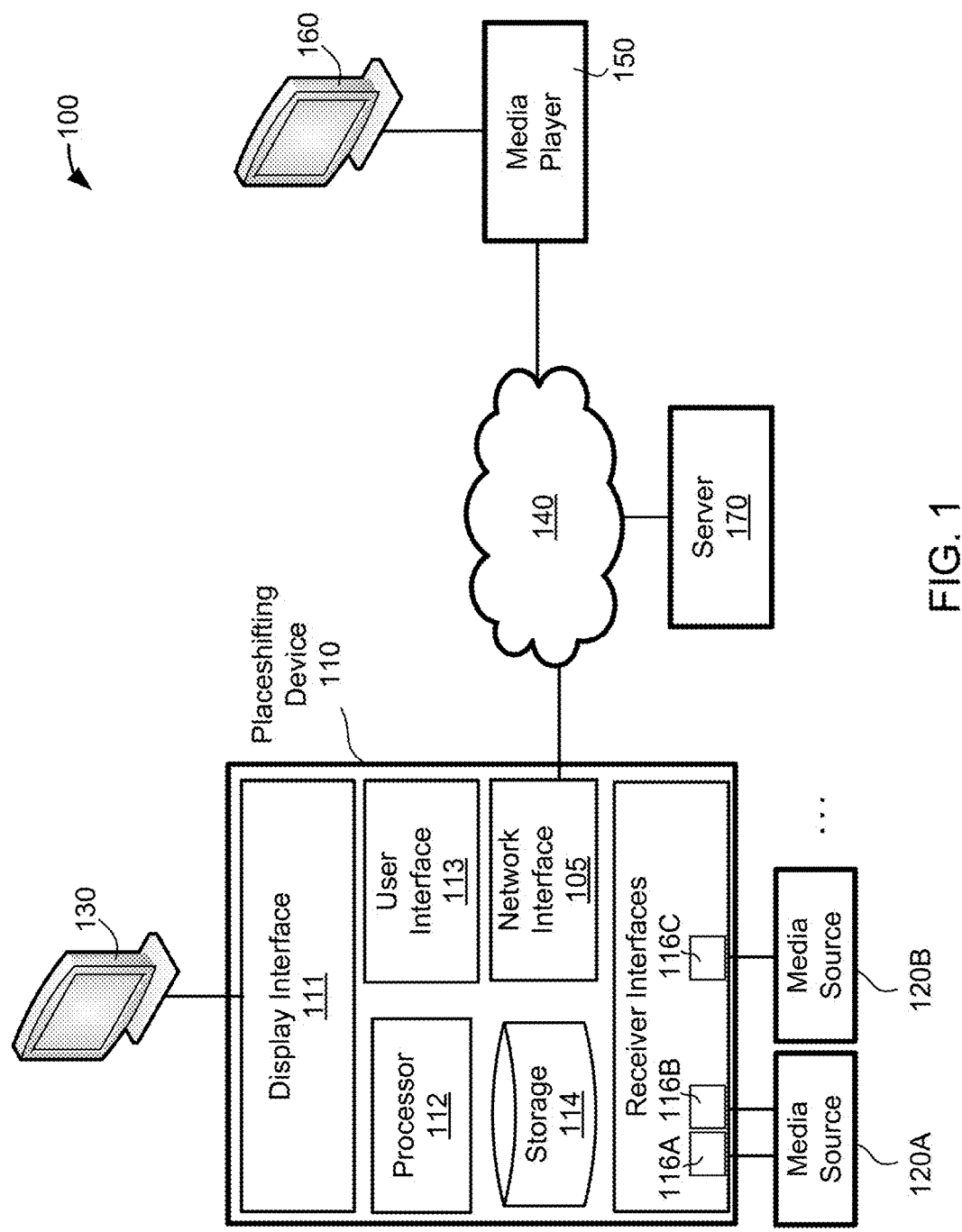

Referring to FIG. 1, an exemplary placeshifting system 100 generally includes a placeshifting device 110 that receives media content from one or more media sources 120, encodes the received content into a suitable format (e.g., a streaming format), and then transmits the encoded media stream to a media player 150 over a network 140 (e.g., a WLAN, the Internet, etc.). Media player 150 receives the encoded stream, decodes the stream, and presents the decoded content to a viewer on a television or other such display 160. Similarly, the content may be viewed locally (with respect to placeshifting device 110) via a display 130.

In various embodiments, a server 170 may also be provided to communicate with placeshifting device 110 and/or media player 150 via network 140 to assist these devices in locating each other, maintaining security, providing or receiving content or information, and/or any other features as desired. In accordance with the present invention, for example, server 170 may be used for storage of configuration settings associated with the various components of placeshifting system 100, e.g., media player 150 and placeshifting device 110.

Media sources 120 (120A, 120B, etc.) may include a wide range of sources now known or later developed, including, for example, broadcast television, cable television, satellite television, "video-on-demand" or similar sources, digital video disk (DVD) players and other removable media, video camera systems, video game consoles, set-top box (STB) systems, Internet media sources (e.g., YouTube), and the like. Media sources 120 will also typically include one or more output interfaces (not illustrated).

Placeshifting device 110 includes any combination of software and/or hardware configured to perform the functionality described herein. In the illustrated embodiment, for example, placeshifting device 110 includes a display interface 111 (coupled to display 1030), a network interface 115 (coupled to network 140), and one or more receiver interfaces 116 (116A, 116B, etc.) coupled to media sources 120. Receiver interfaces 116 include any set of interfaces now known or later developed, such as HDMI, component video, and composite video interfaces.

Placeshifting device 110 includes a user interface module 113 configured to provide interaction between the user and placeshifting device 110 (e.g., via various menus, remote control devices, and other conventional user interface components).

Placeshifting device 110 also includes a controller 112 for coordinating the operation of other components of placeshifting device 110, and suitable storage (e.g., hard disk and/or solid state drives) 114 for storing data received from media sources 120 as well as other data associated with operation of placeshifting device 110. The particular methods described herein may be implemented, for example, using non-transitory computer-readable software instructions executable by a processor or controller 112, and then presented to the user via display 130 and/or display 160. As described in further detail below, controller 112 has a "placeshifting mode" (during which placeshifting device 110 performs placeshifting) and a "pass-through mode" (during which placeshifting device 110 simply allows media content to pass through—e.g., to display 130).

It will be appreciated that placeshifting device 110 will typically include a number of additional hardware and/or software components (e.g., memory, controllers, digital signal processors, etc.), which have been left out of the illustration in the interest of simplicity. For example, placeshifting device 110 will typically incorporate an encoder and/or transcoder module configured to convert audio/video or other data from media sources 120 into a packetized format that can be transmitted over network 140.

Placeshifting device 110 may also include a transmit buffer module that temporarily stores encoded data prior to transmission over network 140 and adjusts one or more parameters of the encoding (e.g., the bit rate of the media stream) to maintain desirable picture quality and data throughput in view of the then-current network performance. Placeshifting device may also be configured to provide commands to one or more of the media sources 120, e.g., to request a desired input signals from that media source. Such commands may be provided over any convenient wired or wireless interface, such as an infrared or other wireless transmitter that emulates remote control commands receivable by the media source 120. Several examples of placeshifting devices may be implemented using any of the various SLINGBOX products available from Sling Media of Foster City, Calif.

In some embodiments, placeshifting device 110 incorporates all or a portion of the functionality typically associated with a particular media source 120. For example, placeshifting device 110 might be a hybrid STB or other receiver that provides transcoding and placeshifting features. Such a device may receive satellite, cable, broadcast and/or other signals that encode television programming or other content received from an antenna, modem, server and/or other source. Such devices may also include a content datastore (stored, for example, within storage 114) to support a personal or digital video recorder (DVR) feature or other content library as appropriate. Stated another way, in some embodiments, media source 120 and placeshifting device 110 are physically and/or logically contained within a common component, housing or chassis.

In some embodiments, placeshifting device 110 is a software application configured to be executed on a conventional computing system (e.g., a personal computer, tablet computer, smartphone, or the like). In such embodiments, placeshifting device 110 may encode some or all of a screen display typically provided to a user of the computing system for placeshifting to media player 150.

Media player 150 may be any device, component, module, hardware, software and/or the like capable of receiving a media stream placeshifting device 110. In various embodiments, media player 150 is a desktop computer, a laptop computer, a tablet computer, a mobile phone, a personal digital assistant, a personal media player (such as the ARCHOS products available from the Archos company of Igny, France) or the like. In many embodiments, media player 150 is a general purpose computing device that includes a media player application that is capable of securely connecting to placeshifting device 110 and receiving and presenting media content to the user of the device as appropriate. In other embodiments, media player 150 is a standalone or other separate hardware device capable of receiving the media stream via network 140 and decoding the media stream to provide an output signal that is presented on a television or other display 160. One example of a standalone media receiver 150 is the SLINGCATCHER product available from Sling Media of Foster City, Calif., although other products might be used in connection with the subject matter described herein.

As is known in the art, an entertainment device (such as placeshifting device 110 and media player 150) will typically include a significant number of configuration settings that control how the device operates. These configuration settings may include settings that are a function of the device itself (e.g., model number), configuration settings that might be editable by the user (e.g., device name, IP address, etc., user language), configuration settings related to a particular installation (e.g., geographic location, Internet provider, firmware version, etc.), and functional configuration settings (beta-enabled, etc.). This is illustrated conceptually in FIG. 2, which shows a set of configuration settings 200 depicted as a simple data structure comprising name/value pairs—i.e., an associative array of names 202 and corresponding values 204. For example, the name may be 'geographical_region', and the corresponding value may be 'west'. It will be appreciated, however, that the configuration settings 200 may be stored (i.e., within the device itself) in any convenient manner. A wide range of configuration settings may be used, depending upon the nature of the device itself. Such configuration settings are known in the art, and thus need not be exhaustively enumerated herein.

Referring now to FIG. 3, a datastore 300 of configuration settings may be used in connection with a configuration settings management system to simplify the compilation, storage of configuration settings. Datastore 300 may be stored in one or more servers anywhere within the network—e.g., within server 170 of FIG. 1. The configuration settings management system described herein in conjunction with datastore 300 will also typically include a combination of hardware and software (e.g., controllers, storage, network interfaces, etc.) implemented conveniently within the network. Such software and hardware systems are well known, and need not be discussed in detail herein.

As illustrated, datastore 300 includes a plurality of data groups or simply "groups" 302 (302A, 302B, etc., or group 0, group 1, group 2, etc.), wherein each group includes a set of configuration settings 310 (e.g., 310A, 310B, etc.), as well as an associated set of "membership criteria" 320 and a "weight" 325. Configuration settings 310 may conform to the data structure depicted in FIG. 2, or be implemented in any other convenient data structure. In general, datastore 300 is used to determine a set of configuration settings to be assembled and transferred to a particular device, either periodically or in response to user request.

The membership criteria 320 for a group 302 determines whether a particular device should be classified as part of that group. Thus, as illustrated, one group may correspond to a particular device model number and firmware version (group 302A), while another group may correspond to a certain geographical region in which the device is deployed (group 302B). Membership criteria 320 may have any form and may be expressed and implemented in any convenient manner. In the illustrated embodiment, membership criteria 320 are shown as Boolean expressions; however, the invention is not so limited. Membership criteria 320 may be based on any combination of configuration settings. As will be appreciated, a single device may be part of multiple groups. That is, a particular device (e.g., placeshifting device 110) may have the model number/firmware combination of group 302A and be located within the geographical region of group 302B. In addition, datastore 300 may include a baseline or "default" group that is associated with all devices (but which may be over-ridden or superseded by other groups, as described below).

Weight 325 provides a way to prioritize the groups in order to determine what configuration settings should ultimately be applied to a particular device. That is, in the case that a device is a member of two or more groups 302, some of the configuration settings 310 may conflict—i.e., the system may have a choice between two or more configuration values for the same configuration name. For example, configuration settings 310B of group 302B may specify a certain configuration value of placeshifting device 110 based on its geographical region, while configuration settings 310A of group 302A may specify a different configuration value based on model number and firmware version. In this case, the configuration management system will choose the value associated with the configuration settings 310 within the group 320 having the greatest weight 325 (in this example, group 302A).

Weight 325 may be expressed or stored as a number within a specified range (e.g., real number between 0.0 and 1.0, an integer between 1 and 100, etc.). Weight 325 might also be expressed as an alphanumeric character ('A1', 'B3', etc.), or as a ranking. The invention is not so limited, however, and contemplates any form of weight that allows conflicts in configuration settings 310 to be resolved).

Figure 4:
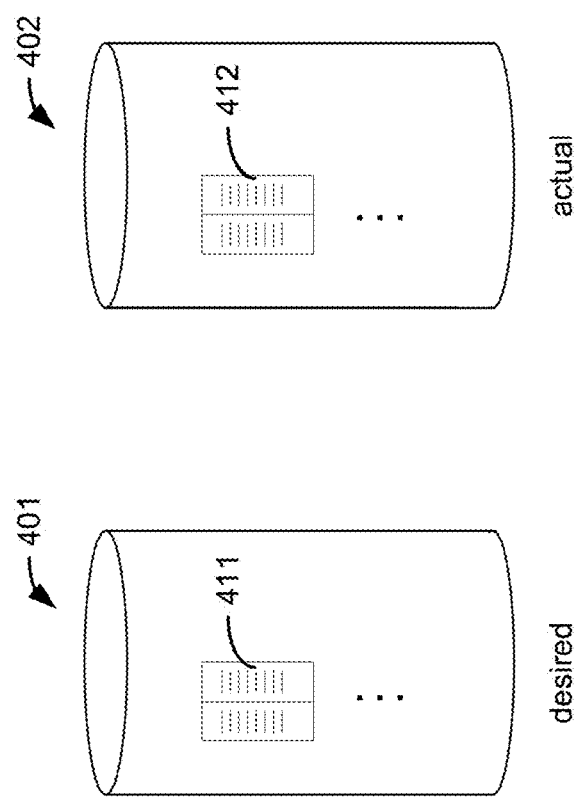
FIG. 4 illustrates configuration data stores in accordance with various embodiments.

Referring to FIG. 4, in accordance with one embodiment, configuration settings may be stored in two datastores: one datastore 401 comprising a set of desired configuration settings 411 for each device, and another datastore 402 comprising a set of actual configuration settings 412 for each device. Actual datastore 402 stores the present state of configuration settings for a device, and desired datastore 401 stores the configuration settings that should be applied to the device, based on the configuration settings 310 and groups 320 defined in FIG. 3. Datastores 401 and 402 may be located anywhere within the network, for example, within server 170 of FIG. 1.

Operation of the configuration setting management system will now be described using the example placeshifting system 100 of FIG. 1 in conjunction with FIGS. 3 and 4.

In general, at some point during day-to-day operation, placeshifting device 110 will send a request to the configuration settings management system (e.g., server 170) seeking the most up-to-date configuration settings. This request may be sent periodically (e.g., once per month), in response to user input (e.g., selecting an "update" menu item), and/or in response to administrator command (e.g., to force a configuration change).

The actual configuration settings of placeshifting device 110 may be known (i.e., via actual datastore 402), or may be transmitted to the system by the device itself. The system then compares the various settings and parameters of placeshifting device 110 to the groups 302 defined within datastore 300. That is, the configuration settings of placeshifting device 110 are compared to the respective membership criteria 320. For each applicable group 302, the appropriate configuration settings are selected, using the weight 325 for each group 325 to resolve possible conflicts in configuration settings. The resulting 'desired' configuration settings are then transmitted back to placeshifting device 110 and/or stored within desired datastore 401 (e.g., for later download by the device).

Thus, the use of weights 325 in conjunction with defined groups 320 allows for simplified management of a large number of configuration settings for a large number of devices. That is, an administrator can easily change the weights and configuration values for certain groups in order to affect a large-scale change in configuration settings.

While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of elements described without departing from the scope of the invention.

What is claimed is:

1. A method executable by a computer server to update the configurations of a plurality of networked devices, the method comprising:

providing, by the computer server, a first datastore including a plurality of data groups, each data group comprising a set of configuration settings for each of the plurality of networked devices, a set of membership criteria associated with each group, and a weight associated with each group, wherein the weight describes a respective priority for the associated group;

receiving, by the computer server, a request for updated configuration settings for one of the networked devices, the request including a set of parameters associated with the networked device;

automatically selecting, by the computer server, a set of desired updated configuration settings for the networked device from the first datastore based on the sets of membership criteria, the set of parameters, and the weights of the plurality of data groups by: determining a subset of data groups for which the set of parameters satisfies the set of membership criteria; and in the case where a first value of a configuration setting for a first data group of the subset of data groups conflicts with a second value of the same configuration setting for a second data group of the subset of data groups, selecting the value of the configuration setting associated with the group having the highest weight; and transmitting the desired updated configuration settings automatically selected by the computer server to the networked device to thereby update the networked device with the updated configuration settings.

2. The method of claim 1, further including a second datastore including actual configuration settings for the networked device, wherein receiving the request includes receiving the set of parameters associated with the networked device from the second datastore.

3. The method of claim 1, wherein the set of parameters includes at least one of a model number and a software version of the networked device.

4. The method of claim 1, wherein the set of parameters includes a geographic region in which the networked device is deployed.

5. The method of claim 1, wherein the first datastore includes a default data group.

6. The method of claim 1, wherein the request for configuration settings is received at least one of periodically, in response to user input, and in response to an administrator command.

7. A computer configuration management system to manage configurations of a plurality of devices each having a plurality of current configuration settings and a list of device parameters, the system comprising:
    a first datastore configured to store a plurality of data groups, each data group comprising a set of configuration settings, a set of membership criteria associated with that group, and a weight that indicates a relative priority associated with that group; and
    a processor configured to:
        receive a request for updated configuration settings from one of the devices;
        automatically select a set of desired updated configuration settings from the first datastore for the device based on the a set of device parameters associated with the device, the sets of membership criteria, and the weights of the plurality of data groups by: determining a subset of data groups for which the set of parameters satisfies the set of membership criteria; and in the case where a first value for a configuration setting associated with a first data group of the subset of data groups conflicts with a second value of a second data group for the same configuration setting, selecting the value of the configuration setting associated with the group having the highest weight; and
        transmit the desired updated configuration settings automatically selected by the configuration management system to the device to thereby update the configuration settings of the device.

8. The system of claim 7, further including a second datastore including actual configuration settings for the networked device, wherein receiving the request includes receiving the set of parameters associated with the networked device from the second datastore.

9. The system of claim 7, wherein the set of parameters includes at least one of a model number and a software version of the device.

10. The system of claim 7, wherein the set of parameters includes a geographic region in which the device is deployed.

11. The system of claim 7, wherein the first datastore includes a default data group.

12. The system of claim 7, wherein the request for configuration settings is received at least one of periodically, in response to user input, and in response to an administrator command.

13. Non-transitory computer-readable media bearing software instructions configured to instruct a processor to perform the steps of:
    receiving a request for updated configuration settings for a networked device, the request including a set of parameters associated with the networked device;
    automatically selecting a set of desired configuration settings from a first datastore based on the sets of membership criteria, the set of parameters, and the weights of the plurality of data groups, wherein the first datastore includes a plurality of data groups, each data group comprising a set of configuration settings, a set of membership criteria associated with that group, and a weight that indicates a relative priority associated with that group, wherein the desired settings are automatically selected by: determining a subset of data groups for which the set of parameters satisfies the set of membership criteria; and in the case where a first value of a a configuration setting for a first data group of the subset of data groups conflicts with a second value of the same configurations setting associated with a second data group of the subset of data groups, selecting the value of the configuration setting that is associated with the group having the highest weight; and
    transmitting the automatically selected desired configuration settings to the networked device to thereby update a configuration of the networked device.

14. The non-transitory computer-readable media of claim 13, wherein the set of parameters is requested from a second datastore comprising actual settings of the networked device.

15. The non-transitory computer-readable media of claim 13, wherein the set of parameters includes at least one of a model number and a software version of the networked device.

16. The non-transitory computer-readable media of claim 13, wherein the set of parameters includes a geographic region in which the networked device is deployed.

17. The non-transitory computer-readable media of claim 13, wherein the first datastore includes a default data group.

18. The non-transitory computer-readable media of claim 13 wherein the networked device is a set top box for receiving broadcast television programming.

\* \* \* \* \*